April 27, 1965    R. W. CRAGER ETAL    3,180,450
EXTENDIBLE MOBILE SCAFFOLDS

Filed Aug. 20, 1963    3 Sheets-Sheet 1

INVENTOR.
RICHARD W. CRAGER
BY FRANK J. MORRIS

Robert W. Beach

ATTORNEY

April 27, 1965

R. W. CRAGER ETAL 3,180,450

EXTENDIBLE MOBILE SCAFFOLDS

Filed Aug. 20, 1963

INVENTOR.
RICHARD W. CRAGER
BY FRANK J. MORRIS

ATTORNEY

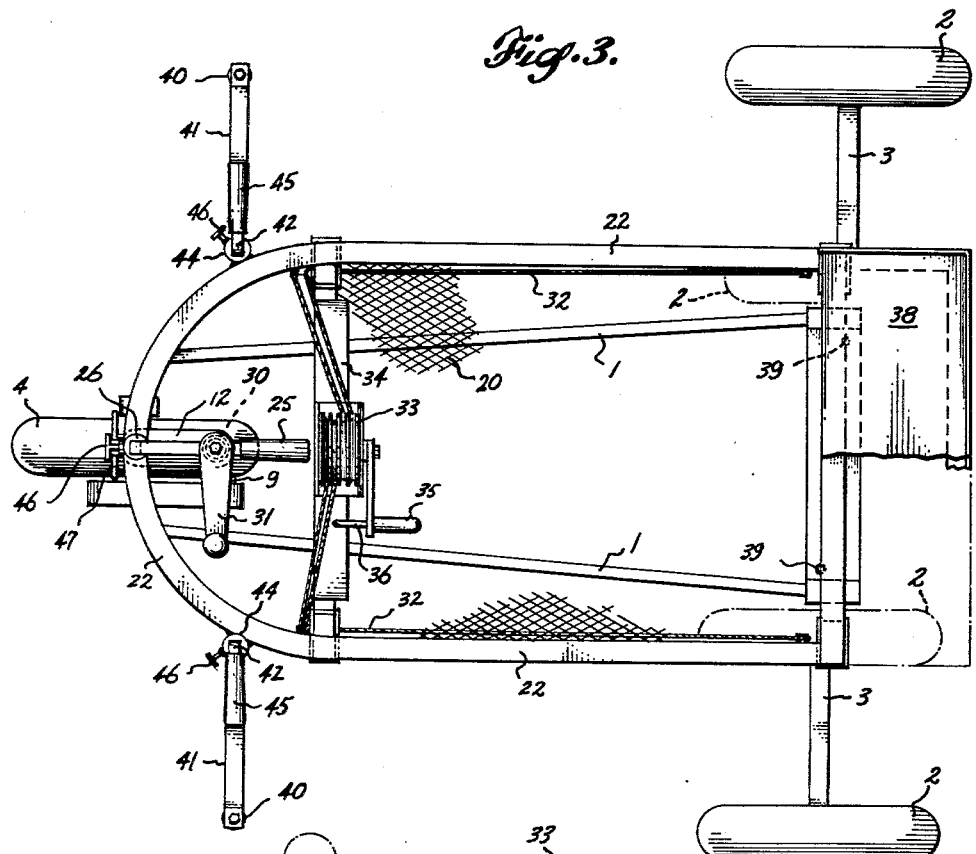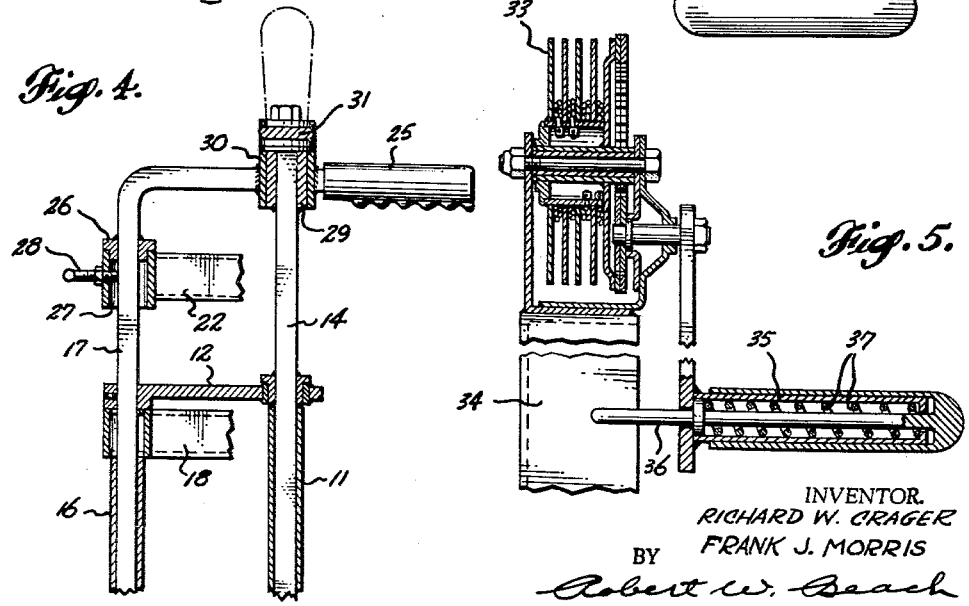

United States Patent Office 3,180,450
Patented Apr. 27, 1965

3,180,450
EXTENDIBLE MOBILE SCAFFOLDS
Richard W. Crager and Frank J. Morris, Port Angeles, Wash., assignors to Angeles Machine & Welding Corporation, Port Angeles, Wash., a corporation of Washington
Filed Aug. 20, 1963, Ser. No. 303,319
5 Claims. (Cl. 182—14)

This invention relates to a scaffold supported on wheels for mobility, the height of which can be extended in varying degrees in accordance with the purpose for which the scaffold is being used. Mechanism is provided for steering and propelling the scaffold, as well as raising and lowering the scaffold platform by a person standing on the platform.

A principal object is to provide such an extendible mobile scaffold having mechanism movable elevationally with the platform of the scaffold so that the platform can be raised and lowered by operation of such mechanism always at the same height, while the operator is standing on the platform variable in elevation.

An additional object is to provide mechanism for propelling and steering the scaffold, which is varied in elevation, automatically in response to alteration in elevation of the scaffold platform.

Another object is to provide a guard rail encircling the working space above the elevationally adjustable platform which is automatically raisable in conjunction with raising of the platform.

A further object is to provide latching mechanism of convenient type for the platform elevation adjusting device.

Another object is to provide outrigger stabilizing mechanism for the mobile scaffold which can be operated from the working platform in various elevationally adjusted positions for the purpose of holding the platform against travelling and stabilizing it against tipping.

The foregoing objects can be accomplished in a mobile scaffold having a wheeled chassis from which a frame projects upwardly to serve the dual function of supporting an elevationally adjustable work platform and guiding such platform for adjustment in elevational relative to the frame. Such frame also serves to guide the elevational adjustment of a guardrail above the platform and which can be raised by raising of the platform. The chassis of tricycle type includes one wheel which can be swivelled to steer travel of the scaffold and rotated to effect such travel. An upright steering rod journaled in the frame can be connected to a steering arm pivotally mounted on the elevationally adjusted guardrail by a telescoping steering rod section, so that the steering rod will be varied in effective length by elevational movement of the guardrail. A propelling crank for rotating the drive wheel can be mounted on the steering arm and connected to the drive wheel by a telescoping drive rod. Elevational adjustment of the platform, steering arm and propelling crank is accomplished by a winch mounted on the elevationally adjustable platform on which platform-hoisting cables are wound. Retractable outrigger legs carried by the frame support ground-engageable braking and stabilizing feet.

FIGURE 3 is a plan of the scaffold, parts of which are broken away.

FIGURE 4 is a detail vertical section through a portion of the steering and propulsion mechanism.

FIGURE 5 is a detail vertical section through a portion of the platform elevation adjusting mechanism.

Figure 1:
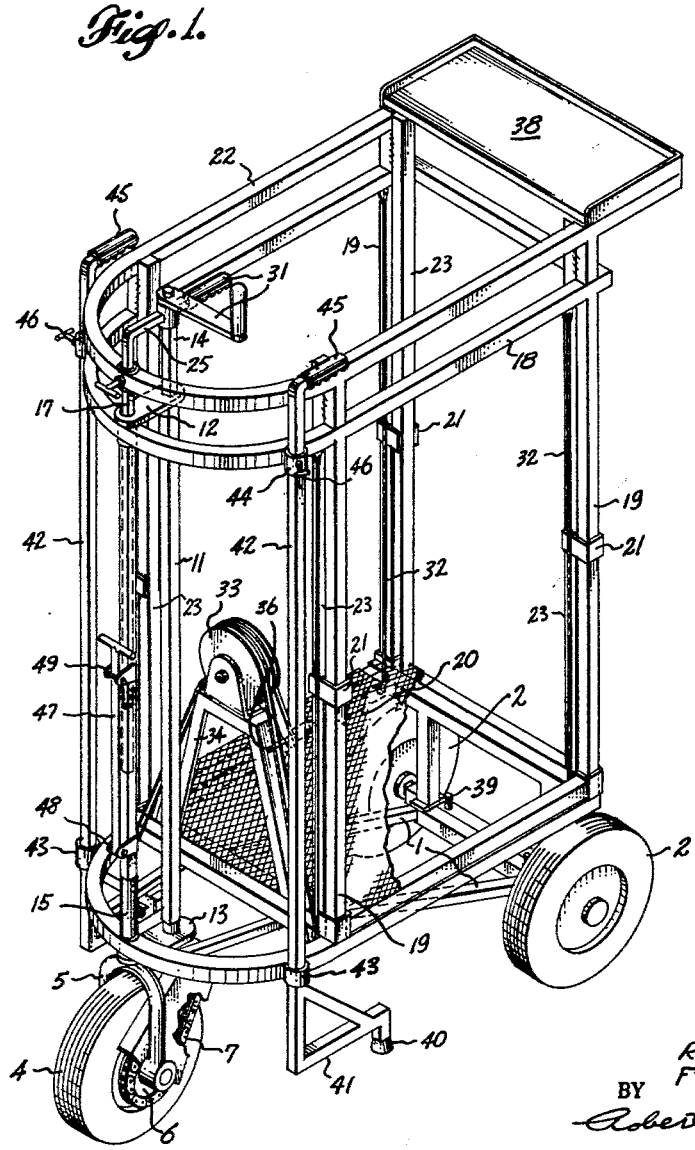
FIGURE 1 is a top perspective of the scaffold with the platform in lowered position, parts being broken away.

The mobile scaffold includes a chassis 1 of the tricycle type supported by two wheels 2 mounted on opposite ends of an axle 3 and a steerable wheel 4 journaled in a fork 5. On this wheel is mounted a drive sprocket 6 which can be turned by a chain 7 driven by a smaller sprocket 8 to provide a mechanical advantage for turning the wheel. This sprocket is mounted on a shaft 9, which is turned by bevel gears 10 which in turn are driven by rotation of a telescoping drive rod including the lower section 11, the opposite ends of which are supported by an upper strap 12 and a lower strap 13. Preferably the lower section of the drive rod is square and an upper drive rod section 14, also square in cross section, can slide telescopically within the lower section 11, so that rotation of one section will effect rotation of the other section in various positions of such drive rod sections effecting variation in the effective length of the drive rod.

The shank 15 of steering fork 5 is journaled in a member of the chassis 1 and a telescoping steering rod including a lower section 16 and an upper section 17 extend upward from the fork shank. Preferably the lower section 16 of such steering rod is larger than the upper section and both are of square cross section, the upper section being slidably received within the lower section. Turning of either section will therefore effect turning of the other section, although the steering rod is variable in effective length by telescoping movement of such sections. The strap 12 connects the upper ends of the lower steering rod section 16 and the lower drive rod section 11, and the strap 13 connects the fork 5 and the lower end of the lower drive rod section 11. Such drive rod section ends are suitably journaled in the straps 12 and 13 so that the drive rod can rotate relative to these straps. Such straps are, however, connected to the steering rod section 16 and to the fork 5 so that when the steering rod is turned the drive rod will traverse an arcuate path about the axis of the steering rod, having a radius equal to the distance between the axes of the steering rod and the drive rod.

The upper end of the lower steering rod section 16 is journaled for rotation in the upper circumferential member 18 of the scaffold frame which is supported by posts 19 from the chassis 1. The platform 20, on which a workman may stand, is received within this frame and has guide collars 21 embracing such posts. The guardrail 22 is supported by posts 23, the lower parts of which carry collars 24 embracing the frame posts 19, which guide such collars for sliding movement along the posts. The upper steering rod section 17 is supported by the guardrail 22 and such support includes a journal for the steering rod section 17 so that it can be turned relative to the guardrail by swinging the steering tiller 25 projecting radially from the upper end of the steering rod section 17 in a direction parallel to the straps 12 and 13.

FIGURE 4 illustrates the journal arrangement for the steering rod as including the collar 26 of circular cross section received in a circular bore 27 in the guardrail 22. A clamping bolt 28 threaded in the guardrail can be screwed into engagement with the steering rod 17 to lock it against being turned so as to hold the wheel 4 against swivelling when desired. On the upper end of the upper drive rod section 14 is a cylindrical bushing 29 received in a guide sleeve 30 carried by the tiller 25. A crank 31 secured to the upper end of the drive rod section 14 above the bushing 29 can be rotated to turn the drive rod 11, 14, bevel gears 10, shaft 9 and sprocket 8 to drive the chain 7 for turning the wheel driving sprocket 6. It will be evident from FIGURE 4 that a driving connection is maintained between the upper and lower sections 11 and 14 of the drive rod and the upper and lower sections 17 and 16 of the steering rod in all elevationally adjusted positions of the guardrail 22, so that turning the crank 31 will propel the scaffold, and swinging the tiller 25 will guide the scaffold in all elevationally adjusted positions of the guardrail.

The elevationally adjustable platform 20 is supported by four cables 32 located adjacent to the four frame posts 19, respectively, and having upper stationary ends anchored to the upper peripheral member 18 of the scaffold frame. At one side of the platform 20 a cable winch 33, having four drums as shown in FIGURE 5, is mounted on an A frame 34 to locate the winch handle 35 at a convenient height to be swung by a workman standing on the platform. The winch includes suitable gearing, as shown in FIGURE 5, so that the winch crank can be swung by turning the handle 35 to raise the platform with a workman on it without excessive effort. Such handle carries a latch pin 36 engageable with either leg of the A frame 34 by a compression spring 37 received with the handle. The latch pin will be freed from engagement with the winch supporting frame 34 by pulling the handle to the right, as seen in FIGURES 3 and 5, so that the winch crank can be rotated.

From their anchored or dead ends secured to the upper frame member 18, the two platform supporting cables 32 alongside the frame posts 19 remote from the winch 33 pass downward beneath the platform 20, across under the platform to the winch side, as shown in FIGURE 3, and up to two drums of the winch. The two platform supporting cables at the winch side of the platform extend from their dead or anchored ends on the frame upper member 18 down beneath the platform and then up to the other two drums of the winch 33. Such cables will pass beneath guide pulleys on the bottom of the platform by which the weight of the platform and of the workman standing on it will be supported from the cables. As the winch handle 35 is turned in a direction to reel in the cables 32 they will be wound simultaneously and equally on the four drums of the winch so that the cables will all be shortened to the same extent. By this operation the platform 20 will be raised a distance equal to substantially the length of each cable reeled in.

As the platform 20 is raised the guardrail 22, supported by posts 23, will be moved upward by upward movement of the platform and through the same distance. Consequently, the guardrail and the tiller 25 and propelling crank 31, mounted on the guardrail, will be maintained at all times the same predetermined distance above the workman supporting platform 20. On the guardrail 22 a shelf 38 can be supported on which tools, paint cans or other equipment can be placed, which will also remain at a given predetermined distance above the platform. As the platform is raised or lowered to the desired position for any particular operation by rotation of the winch crank the handle 35, pulled to the right, as seen in FIGURES 3 and 5, during such operation, can be released so that the latch pin 36 will be projected to the left, as seen in FIGURE 5, by the spring 37 into registry with the winch supporting frame 34. If the winch crank is then allowed to turn in a lowering direction by easing off on the crank the latch pin will engage one or the other of the A frame legs to hold the platform 20 in the corresponding elevationally adjusted position.

Figure 2:
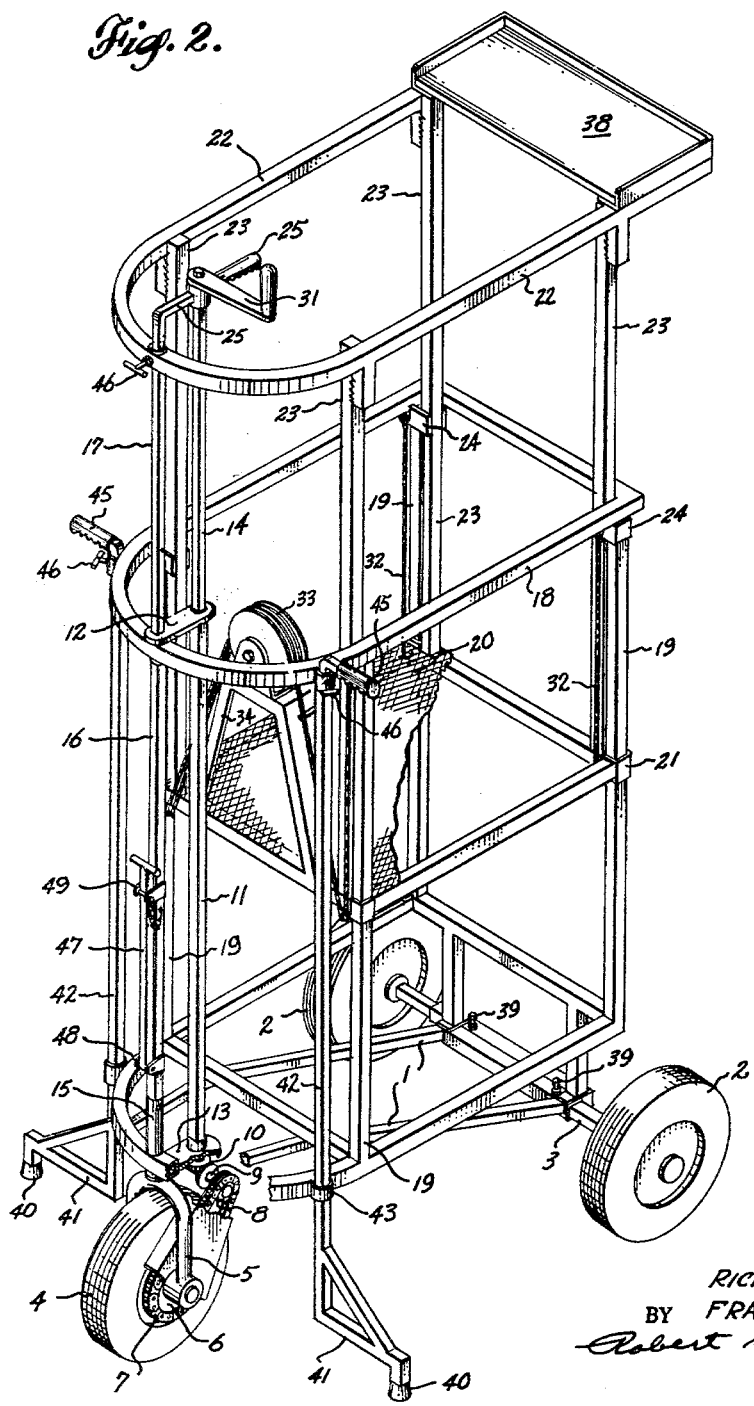
FIGURE 2 is a top perspective of the scaffold with the platform in a raised position, and having parts broken away.

In order to provide adequate stability for the scaffold while in use it is preferred that the axles 3 supporting the coaxial wheels 2 be slidable lengthwise so that the wheels can be moved between the inner travelling positions, shown in FIGURE 1, and the outer or extended stabilizing positions, shown in FIGURE 2. Such axles can be latched in one or the other lengthwise adjusted positions by latch pins 39 engageable in holes in the axle sections. Also, outboard stabilizing feet 40 can be provided at the side of the chassis opposite the wheels 2, which are carried by the outrigger legs 41. These feet can be engaged with the ground both to brake the scaffold against travelling and to cooperate with the wheels 2 in holding the scaffold against tilting.

Each outrigger leg 41 is mounted on the lower end of an upright 42 longitudinally slidable in lower guides 43 and upper guides 44. Such uprights are also rotatable in such guides to enable the outrigger legs 41 to be swung between a position disposed substantially perpendicular to a vertical plane through the axles 3, as shown in FIGURE 1, and a stabilizing position disposed substantially parallel to such a vertical plane through the axle 3. During swinging of the outrigger legs between these two positions the uprights 42 can be raised by a workman on platform 20 grasping the handles 45 on the upper ends of the uprights. The outrigger legs can be held in the inwardly swung and raised retracted position of FIGURE 1 or the outwardly swung and depressed position of FIGURE 2 by tightening the clamp bolt 46 against the upright.

In order to enable the scaffold to be moved to the general location where it is to be used a pulling tongue 47 is secured to the steering rod section 16 by a yoke 48. When not in use this tongue can be held in an upwardly swung position shown in FIGURES 1 and 2 by a suitable latch 49. When the scaffold has been moved to the vicinity where it is to be used the axle latches 39 can be released and the wheels 2 can be pulled out into the extended positions shown in FIGURE 2, and the latches 39 reengaged. The workman can then climb through the open side of the frame remote from which 33 onto the platform 20 while it is in its lowest position, shown in FIGURE 1. The workman will then successively grasp the stabilizer handles 45, release the respective clamp screws 46, swing such handles to turn the outrigger legs 41 from the retracted positions shown in FIGURE 1 to the stabilizing positions shown in FIGURE 2, push such handles down to engage the feet 40 with the ground and secure the uprights 42 in such stabilizing positions by again tightening the clamp bolts 46.

When the scaffold has thus been located and steadied the workman can pull the winch handle 35 to the right, as seen in FIGURES 3 and 5, and rotate it to turn the winch drum 33 for raising the platform 20 and the guardrail 22 to the desired elevation for working. If the workman should need to shift the position of the scaffold while it is thus elevated he can release the clamp screws 46 and then, by grasping handles 45 successively, he can lift the uprights 42 and the outrigger legs 41 and swing them from the stabilizing positions shown in FIGURE 2 into the retracted positions shown in FIGURE 1 and secure them in such retracted positions by tightening the clamp screws 46. The steering rod clamp screw 28 can then be released and the scaffold can be propelled forward or backward by turning crank 31 in the appropriate direction while steering the wheel 4 by swinging the tiller 25, as may be desired. When the proper new position of the scaffold has been established the clamp bolt 28 can be tightened to secure the steering arm against turning and the outrigger legs can be swung back from the re-retracted position of FIGURE 1 to the stabilizing position of FIGURE 2 and moved downward to engage the feet 40 with the ground for braking the platform against movement and stabilizing it against tilting again.

We claim:

1. An extendible mobile scaffold comprising a frame, a platform guided by said frame for elevational movement, cable supporting means supporting said platform from said frame including supporting cables attached to said frame and supportingly engaged by said platform and winch means connected to said cables, carried by said platform and manually operable by a person on said platform to vary the effective length of said cables for altering the elevation of said platform relative to said frame, a guardrail above said platform and guided by said frame for elevational movement by movement of said platform, a wheeled chassis supporting said frame and including a steerable and propellable wheel, steering means for said steerable wheel supported from said guardrail and movable elevationally relative to said steerable wheel by elevational movement of said guardrail, propelling mechanism connected between said propellable wheel and said guardrail operable from said guardrail to drive said wheel and variable in effective length by elevational movement of said guardrail, stabilizing outrigger legs movable between retracted positions and stabilizing ground-engaging positions at opposite sides of said frame to deter tilting of said frame, and outrigger leg moving mechanism connected to said outrigger legs and operable by a person on said platform to move said outrigger legs between such retracted positions and such ground-engaging stabilizing positions.

2. A mobile scaffold comprising a frame, an elevated platform carried by said frame, a wheeled chassis supporting said frame and including a propellable wheel steerable by swivelling about an upright axis, an upright steering rod coinciding with such axis, a tiller carried by and projecting laterally from the upper portion of said steering rod, a support member connected to the lower portion of said steering rod and projecting laterally therefrom parallel to said tiller, and propelling mechanism connected to said wheel and including an upright drive rod parallel to said upright steering rod, drive means connecting the lower end of said drive rod to said wheel to effect rotation of said wheel by turning of said drive rod, mounting means for said drive rod including said tiller and said support member, movable in synchronism with rotation of said steering rod for effecting orbital movement of said drive rod around said steering rod to the extent that said tiller is swung and means operable to rotate said drive rod relative to said mounting means to effect rotation of said wheel during swinging of said mounting means by said tiller about the axis of said steering rod.

3. The mobile scaffold defined in claim 2, in which the platform is guided by the frame for elevational movement, and the steering rod and the drive rod are of telescoping character variable in effective length in accordance with the elevated position of the platform relative to the frame.

4. The mobile scaffold defined in claim 2, and a guardrail above the platform, the upper portion of the steering rod being connected to the guardrail and steadied by such connection during swinging of the tiller and actuation of the drive rod rotating means.

5. A mobile scaffold comprising a frame, an elevated platform carried by said frame, a wheeled chassis supporting said frame, an upright shaft mounted in said frame for both rotation and reciprocation, a stabilizing outrigger leg projecting laterally from the lower portion of said shaft to be swung by rotation of said shaft between an inwardly swung retracted position and an outwardly swung projected position, and said outrigger leg being movable between an elevated ground-clearing position and a lowered ground-engaging position by reciprocation of said shaft, and outrigger leg-moving means connected to the upper portion of said shaft and operable by a person on said platform to rotate said shaft for moving said outrigger leg between retracted position and projected position and to reciprocate said shaft for moving said outrigger leg between such an elevated ground-clearing position and such lowered ground-engaging position.

References Cited by the Examiner
UNITED STATES PATENTS

| | | | |
|---|---|---|---|
| 530,389 | 12/94 | Brooks | 182—144 |
| 1,184,361 | 5/16 | Lillge et al. | 182—145 |
| 2,183,679 | 12/39 | Hillis | 182—14 |
| 2,380,160 | 7/45 | Fieroh | 182—17 |
| 2,506,860 | 5/50 | Dimon | 182—13 |
| 2,573,575 | 10/51 | Keroson | 182—14 |

FOREIGN PATENTS 639,494   6/50   Great Britain.

HARRISON R. MOSELEY, *Primary Examiner.*